Oct. 17, 1944.  H. R. VOORHEES ET AL  2,360,530

MOTOR VEHICLE LIGHTING

Filed Oct. 10, 1941

INVENTORS.
Henry R. Voorhees
Homer C. Simons.
BY
Harness, Dind, Patel & Harris
ATTORNEYS.

Patented Oct. 17, 1944

2,360,530

UNITED STATES PATENT OFFICE 2,360,530

MOTOR VEHICLE LIGHTING

Henry R. Voorhees, Detroit, and Homer C. Simons, Ferndale, Mich., assignors to Chrysler Corporation, Highland Park, Mich., a corporation of Delaware Application October 10, 1941, Serial No. 414,408

2 Claims. (Cl. 240—7.1)

This invention relates to motor vehicles and more particularly to headlamp structures therefor.

An object of the invention is the provision in a motor vehicle having a frontal surface provided with spaced openings and a headlamp structure behind each of the latter, of a closure for each of the openings together with improved means mounting the closure for movement to mask and unmask the lamp with respect to the opening, the closures when in masking position completing the surface continuity of the frontal surface.

More particularly an object of the invention is the provision of a closure having a support which is shiftable to accommodate movement of the closure in a direction generally transversely of its normal path of movement between masking and unmasking positions as aforesaid as an incident to movement of the closure in this path.

A further object of the invention is to provide actuating means for moving the closure and support as aforesaid.

Other objects and advantages of the invention will be more apparent from the following description taken in connection with the accompanying drawing, in which.

Figure 1:
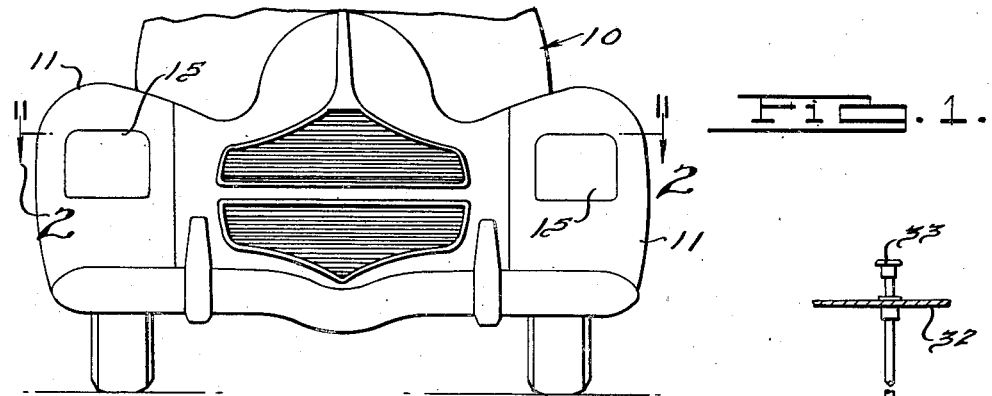
Fig. 1 is a front elevational view of a motor vehicle embodying the invention.
Figure 2:
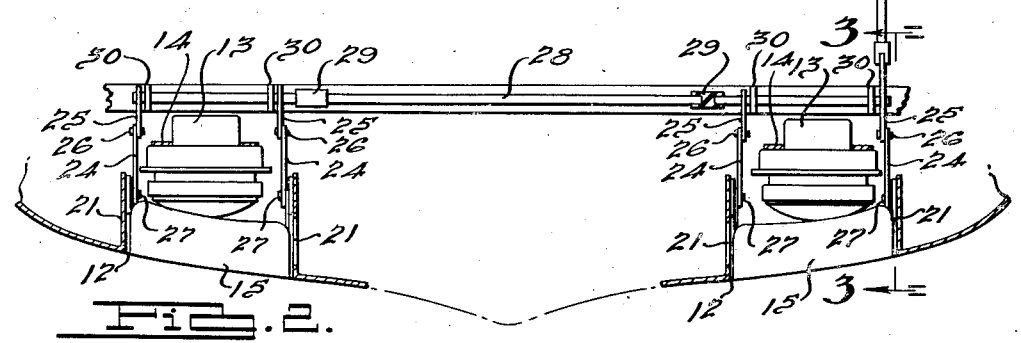
Fig. 2 is a top plan view, partly in section, taken on the line 2—2 of Fig. 1.

Referring to the drawing, the numeral 10 designates a motor vehicle having a frontal surface, a portion of which is provided by a pair of front fenders 11, each of which has an opening 12 therein. A headlamp structure 13 fixedly secured to a support 14 is positioned rearwardly of each opening and the latter is provided with a closure 15 completing the continuity of the frontal surface. Each closure is adapted to be moved from a position masking the lamp to a position unmasking the latter as shown by the dotted lines in Fig. 3. In order to break any sealing formed by ice for example between the closures and the adjacent fender frontal surface, as well as to insure the necessary clearance to accommodate movement of the closure from masking to unmasking position, each closure is adapted to be moved to the position indicated by dot and dash lines in Fig. 3, it being understood that the closure is moved from the last mentioned position to its full line position as an incident to movement thereof from an unmasking to a masking position.

Figure 3:
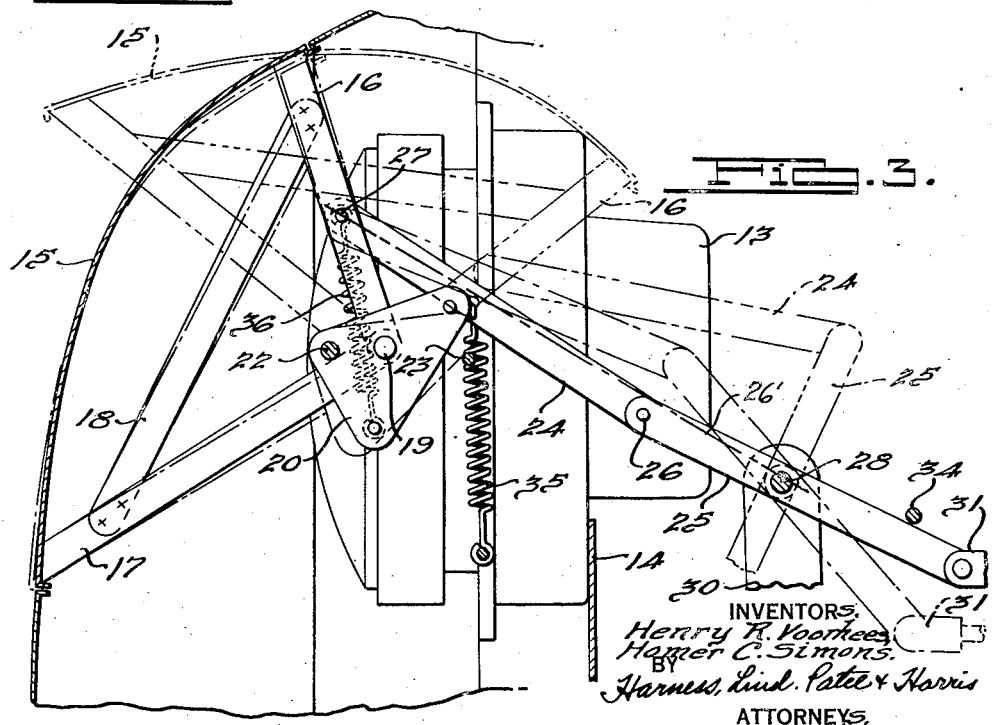
Fig. 3 is an enlarged side elevational view, partly in section, taken as indicated by the line 3—3 of Fig. 2.

As shown more particularly in Fig. 3, each closure has a frontal surface portion and a rearwardly extending portion including spaced pairs of angularly arranged arms, the arms of one of such pairs being shown at 16 and 17 and being connected by a reinforcing arm 18. The adjacent ends of each pair of these arms are pivotally connected by a pin 19 to a plate-like supporting member 20. Each member 20 is supported for limited swinging movement from the adjacent rearwardly extending fender portion 21 by a pin 22, a stop 23 carried by the latter portion limiting such swinging movement.

Each closure and the support therefor are moved by a pair of laterally spaced linkages each including link members 24 and 25 pivotally connected at 26. The members 24 of each pair of linkages are pivotally secured to the arms 16, respectively, by a pin 27, and the arms 25 are non-rotatably secured to a cross rod 28, consisting of three sections having the adjacent ends connected by a body of rubber-like material 29, the rod 28 being supported for oscillatory movement by a plurality of uprights 30. One of the links 25 extends rearwardly with respect to the vehicle beyond the rod 28 for attachment to a relatively rigid operating member 31 supported from the vehicle dash 32 and having an end portion 33 disposed convenient to the vehicle operator. A stop 34 is engaged by the longer arm 25 to limit swinging movement of the linkages in one direction.

Each linkage is urged to its full line position, as shown in Fig. 3, by a spring secured to each link member 24, one of such springs being shown at 35 and movement of the closures from unmasking to masking position is aided by springs secured to each associated pin 27 and support member 20, one of such springs being shown at 36 in Fig. 3. The connection at 26 between the links 24 and 25 is disposed in laterally spaced relation to a line 26' extending between the connections 27 and 28 when the closure is in masking position, as is shown in Fig. 3.

In operation, the closures 15 are moved from closed or masking position to open or unmasking position by the vehicle operator exerting a push on the end 33 of the operating member 31 to oscillate the rod 28 in a clockwise direction and swing each linkage to the dot and dash line position of Fig. 3, thereby swinging the supports 20 in a clockwise direction to the dotted line position whereupon they engage the stops 23. This movement of the supports 20 serves to shift the closures 15 relative to the openings 12 so that the upper portion of each closure is retracted from its opening and positioned as shown by the dot and dash lines in Fig. 3. This initial closure movement serves to break any seal which may have been formed by ice, for example, between the closure and fender surfaces and also provides such clearance as may be necessary to accommodate swinging of the closure to unmasking position.

When the supports 20 are engaged with their stop 23 and the closures retracted as aforesaid, subsequent movement of the operator 31 serves to swing the linkages to their Fig. 3 dotted line position and to swing the closures 15 in an arcuate path relative to the supports 20 to an unmasking position, as shown by dotted lines in Fig. 3, above the lamps 13. Opposite movement of the operating mechanism disposes the closures in masking position by first swinging the same in an arcuate path relative to their supports and subsequently swinging the latter.

Although but one embodiment of the invention is herein shown and described, it will be understood that various changes in the size, shape and arrangement of parts may be made without departing from the spirit of our invention and it is not our intention to limit said invention other than by the terms of the appended claims.

We claim:

1. In a motor vehicle having a frontal surface provided with an opening, a headlamp structure disposed rearwardly of the opening, a closure for said opening movable to mask and unmask the lamp with respect thereto, a support for said closure swingable about an axis to retract at least a portion of the latter from the opening when the closure is in masking position, stop means limiting swinging movement of said support, means securing said closure to said support for movement relative thereto about an axis spaced from the first mentioned axis from a retracted position to an unmasking position when said stop means is operable to limit movement of said support, and means including a toggle linkage for moving said closure and support as aforesaid, said linkage including a pivotally movable first link and a second link pivotally connected with the closure and first link and operable in response to pivotal movement of said first link to initially swing said support for engagement with said stop means, said link being bodily movable relative to said support for moving said closure relative to said support as aforesaid when the latter is engaged with said stop means.

2. In a motor vehicle having a frontal surface provided with an opening, a headlamp registering with said opening, a closure for said opening, means supporting said closure for movement between positions respectively masking and unmasking the lamp with respect to the opening, said means including a support member pivotally movable from a first position to a second position to thereby pivot said closure about a first axis during a portion of the cycle of movement of the closure from one of its positions to another thereof, a connection between said member and said closure accommodating pivoting of said closure about a second axis when said member is in its second position during another portion of said cycle of closure movement, means for moving said closure and support as aforesaid, and a support for said means, said moving means including pivotally connected links respectively pivotally connected with the closure and support, the pivotal connection between said links being disposed in laterally spaced relation to a line extending between the pivotal connections of said links with the closure and support as aforesaid when the closure is in its masking position.

HENRY R. VOORHEES.
HOMER C. SIMONS.